United States Patent
Hackney

(10) Patent No.: US 10,489,530 B2
(45) Date of Patent: Nov. 26, 2019

(54) METHOD FOR DETERMINING AN EMISSION BEHAVIOUR

(71) Applicant: Siemens Aktiengesellschaft, Munich (DE)

(72) Inventor: Richard Hackney, Lincoln (GB)

(73) Assignee: Siemens Aktiengesellschaft, Munich (DE)

( * ) Notice: Subject to any disclaimer, the term of this patent is extended or adjusted under 35 U.S.C. 154(b) by 173 days.

(21) Appl. No.: 15/514,756

(22) PCT Filed: Oct. 15, 2015

(86) PCT No.: PCT/EP2015/073830
§ 371 (c)(1),
(2) Date: Mar. 27, 2017

(87) PCT Pub. No.: WO2016/062598
PCT Pub. Date: Apr. 28, 2016

(65) Prior Publication Data
US 2017/0308632 A1    Oct. 26, 2017

(30) Foreign Application Priority Data

Oct. 22, 2014    (EP) .................................... 14189956

(51) Int. Cl.
*G06F 17/50* (2006.01)
*G05B 17/02* (2006.01)
(Continued)

(52) U.S. Cl.
CPC ....... *G06F 17/5009* (2013.01); *F01D 21/003* (2013.01); *F02C 7/228* (2013.01);
(Continued)

(58) Field of Classification Search
USPC ........................................................ 703/2, 5
See application file for complete search history.

(56) References Cited

U.S. PATENT DOCUMENTS 3,785,145 A    1/1974  Amann
5,539,638 A    7/1996  Keeler
(Continued)

FOREIGN PATENT DOCUMENTS

EP    2177963 A1    4/2010
EP    1864193 B1    7/2010
(Continued)

OTHER PUBLICATIONS

RU search report dated Apr. 25, 2018, for RU patent application No. 2017113814/06.
(Continued)

*Primary Examiner* — Thai Q Phan
(74) *Attorney, Agent, or Firm* — Beusse Wolter Sanks & Maire

(57) ABSTRACT

A method for determining an emission behaviour of a gas turbine engine. In order to provide a reliable operation of the gas turbine engine the method includes: parameterising the emission behaviour of the gas turbine engine for at least one selected first state variable of the gas turbine engine by using a model, which reflects a state behaviour of the gas turbine engine, and determining the emission behaviour of the gas turbine engine by using the parameterisation.

20 Claims, 7 Drawing Sheets

(51) Int. Cl.
   *G05B 23/02* (2006.01)
   *F02C 9/28* (2006.01)
   *F01D 21/00* (2006.01)
   *F02C 7/228* (2006.01)
   *G05B 13/04* (2006.01)

(52) U.S. Cl.
   CPC ............... *F02C 9/28* (2013.01); *G05B 17/02* (2013.01); *G05B 23/0254* (2013.01); *F05D 2220/32* (2013.01); *F05D 2260/81* (2013.01); *F05D 2270/082* (2013.01); *F05D 2270/083* (2013.01); *F05D 2270/44* (2013.01); *G05B 13/048* (2013.01); *G06F 2217/16* (2013.01)

(56) References Cited

U.S. PATENT DOCUMENTS

| | | | | |
|---|---|---|---|---|
| 9,856,797 | B2* | 1/2018 | Morgan | G05B 17/02 |
| 9,879,613 | B2* | 1/2018 | Davis, Jr. | F02C 9/28 |
| 9,879,614 | B2* | 1/2018 | Davis, Jr. | F02C 9/28 |
| 9,882,454 | B2* | 1/2018 | Davis, Jr. | F02C 9/00 |
| 2003/0074171 | A1 | 4/2003 | Desai | |
| 2004/0123600 | A1* | 7/2004 | Brunell | F02C 9/00 |
| | | | | 60/773 |
| 2010/0100248 | A1 | 4/2010 | Minto et al. | |
| 2013/0024179 | A1* | 1/2013 | Mazzaro | G06Q 10/04 |
| | | | | 703/18 |
| 2017/0089267 | A1* | 3/2017 | Harper | F02C 7/26 |
| 2017/0175647 | A1* | 6/2017 | Davis, Jr. | F02C 9/28 |
| 2017/0176960 | A1* | 6/2017 | Davis, Jr. | F02C 9/28 |
| 2017/0179790 | A1* | 6/2017 | Davis, Jr. | F02C 9/00 |
| 2018/0135534 | A1* | 5/2018 | Ewens | F02C 9/28 |

FOREIGN PATENT DOCUMENTS

| | | |
|---|---|---|
| EP | 2423768 A2 | 2/2012 |
| EP | 2570877 A1 | 3/2013 |
| JP | H09501782 A | 2/1997 |
| JP | 2003129866 A | 5/2003 |
| JP | 2009162231 A | 7/2009 |
| JP | 2012207564 A | 10/2012 |
| RU | 2190875 C2 | 10/2002 |

OTHER PUBLICATIONS

International Search Report dated Jan. 20, 2016, for PCT/EP2015/072830.

* cited by examiner

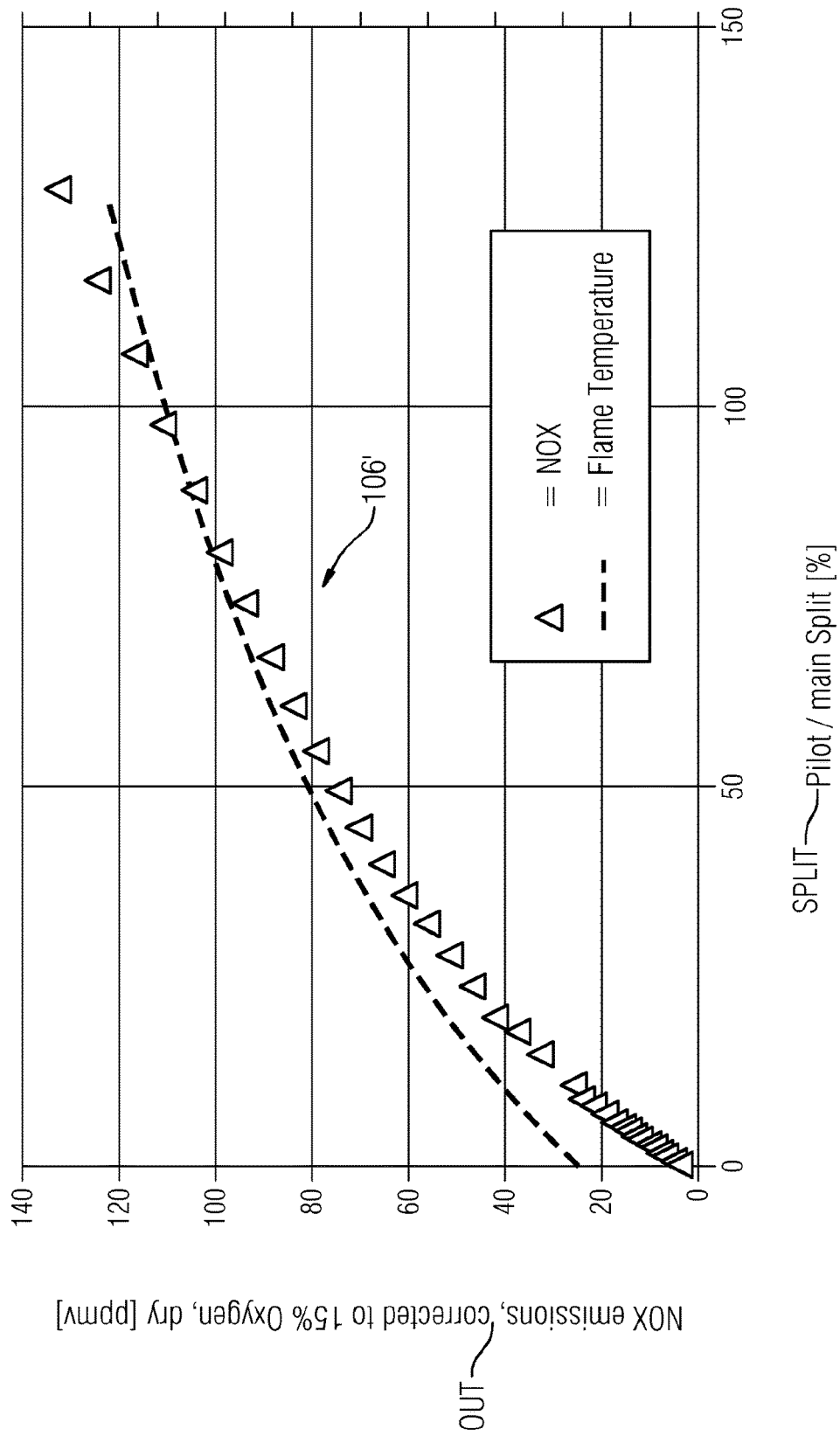

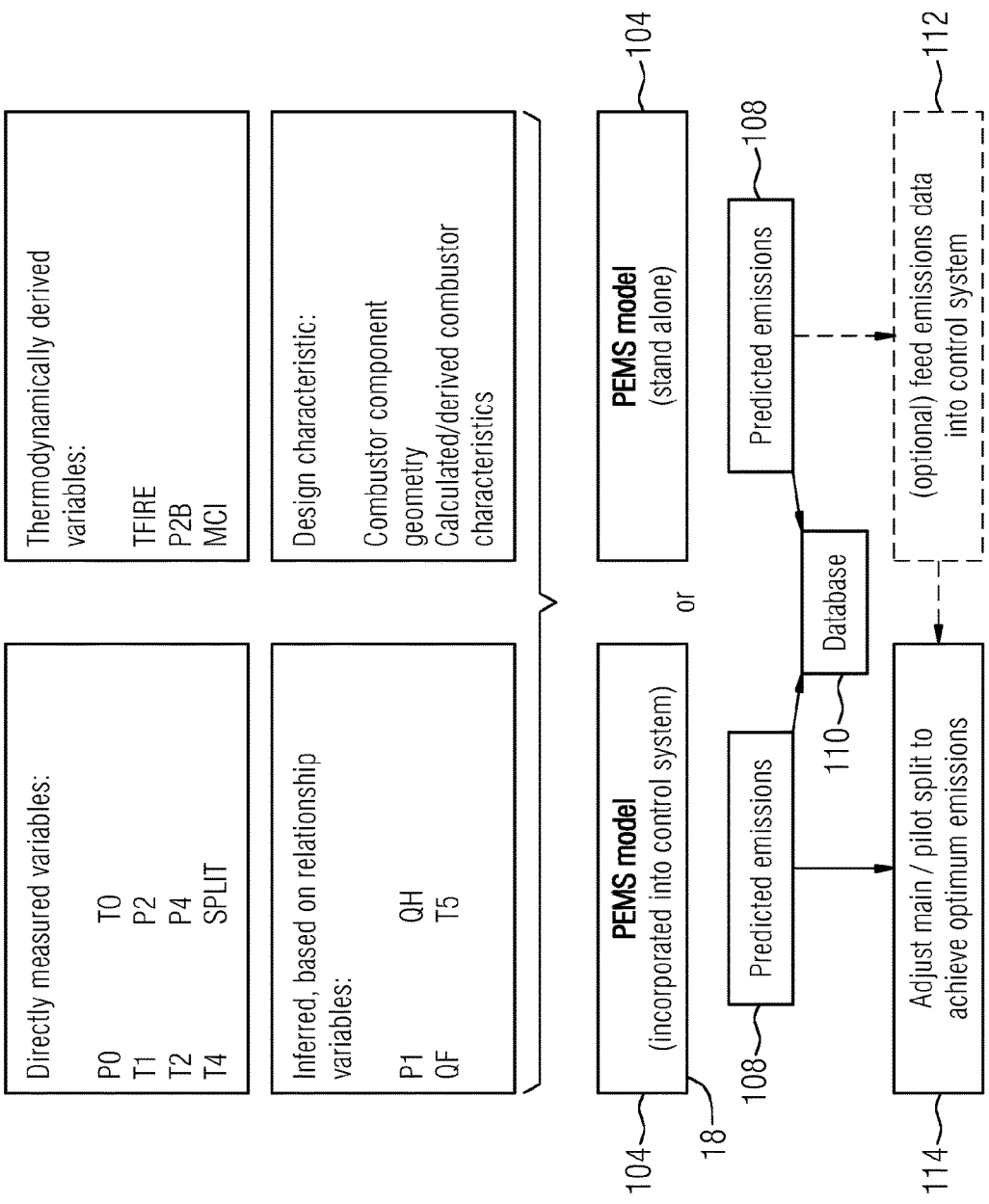

METHOD FOR DETERMINING AN EMISSION BEHAVIOUR

CROSS REFERENCE TO RELATED APPLICATIONS

This application is the US National Stage of International Application No. PCT/EP2015/073830 filed Oct. 15, 2015, and claims the benefit thereof. The International Application claims the benefit of European Application No. EP14189956 filed Oct. 22, 2014. All of the applications are incorporated by reference herein in their entirety.

FIELD OF THE INVENTION

The present invention relates to a method for determining an emission behaviour of a gas turbine engine. The present invention further relates to a gas turbine engine operateable with such a method.

BACKGROUND TO THE INVENTION

It is well known that industrial plants produce not only vast amounts of energy but also emissions, like nitrogen oxides ($NO_x$) and carbon oxides (CO), that can be harmful to humans and the environment. Thus, high efforts are made to reduce these pollutants. Hence, it is essential to monitor emissions from industrial plants. Moreover, depending on the size of an industrial plant, and applicable regulations, the continuous monitoring of emission levels (primarily $NO_x$) is legal requirement for some industrial combustion processes.

Continuous monitoring of plant emissions may be done by either Automated Emission Monitoring Systems (AMS), which is a direct continuous method of emissions measurement, or by a Predicted Emissions Monitoring System (PEMS), which uses characteristic process parameters to calculate (predict) emission levels. Of the two methods, PEMS has a significantly lower operating cost and complexity of operation. However, PEMS models typically require significant 'training' and calibration on site, and only tend to be applicable to a specific plant within calibrated operating/ambient conditions (see below). Such a system is for example described in EP 1 864 193 B1.

Because PEMS models are typically produced by third parties who may not have the same detailed product knowledge available compared to that of an Original Equipment Manufacturer (OEM), current PEMS models typically rely heavily on on-site 'training' (i.e. neural network-type setups) and calibration, and the model varies from site to site even for the same plant configuration. While a basic model may exist, and have some fundamental combustion characteristics included, the model is essentially an empirically-based relationship between process parameter and emission levels. Such models often require regular 'recalibration' following an engine's normal degradation over time. The accuracy of these models at ambient and operational conditions beyond their calibration range are questionable.

SUMMARY OF THE INVENTION

It is a first objective of the present invention to provide a method for determining an emission behaviour of a gas turbine engine with which the above-mentioned shortcomings can be mitigated, and especially providing a time efficient and reliable operation of the gas turbine engine.

It is a second objective of the invention to provide a gas turbine engine that can be operated reliably and with reduced emission levels.

These objectives may be solved by a method and a gas turbine engine according to the subject-matter of the independent claims.

Accordingly, the present invention provides a method for determining an emission behaviour of a gas turbine engine. It is provided that the method comprises the further steps of: parameterising the emission behaviour of the gas turbine engine for at least one selected first state variable of the gas turbine engine by using a model, which reflects a state behaviour of the gas turbine engine, and determining the emission behaviour of the gas turbine engine by using the parameterisation.

Due to the inventive method the PEMS model will be able to predict emissions for a wide range of input conditions. Further, the inventive method will allow predicted emissions levels to be utilized in the optimization of actual emission levels. This will for example obtain a balance between combustor pressure dynamics and low emissions, e.g. $NO_x$. Furthermore, the confidence of the model being accurate over a wider range of input and operating conditions is higher than with conventional system, especially if the model is based on chemical kinetic fundamentals. Moreover, the PEMS model is relatively independent of site specific configuration and requires a minimum of adjustment and 'training' on site. Advantageously, it will also accommodate changes to engine operation over extended periods due, for example, to component degradation or the effects of changes to the installation (e.g. fuels, filters, burners). The model is used to make prediction of the emission behaviour under selected conditions. This results in 'signatures' representing these conditions, which were then used in the PEMS model. The use of 'signatures' rather than the model itself means that a complex (and hence time consuming) model can be used to model the combustion, but the final site-based version can be a much simpler and faster running piece of software.

Even if a term like state variable, processing unit or fuel supply arrangement is used in the singular or in a specific numeral form in the claims and the specification the scope of the patent (application) should not be restricted to the singular or the specific numeral form. It should also lie in the scope of the invention to have more than one or a plurality of the above mentioned term(s) or structure(s).

In this context a state behaviour is intended to mean a result of a specific condition or state of the gas turbine engine or a part thereof, like operating during a starting sequence of the gas turbine engine or operating in a high temperature environment etc., and an emission behaviour is intended to mean a result of a specific condition of the gas turbine engine or a part thereof concerning the emission(s) of the gas turbine engine or the part thereof. This may be a one-dimensional value e.g. an emission level or a multidimensional depiction depending on more than one value or on at least to different kinds of values, like a signature of the emission e.g. the change of the emission level over time or in referenced to a combustion temperature. Moreover, a state variable is intended to mean a variable representing a selected or specific state of the gas turbine engine, like a temperature at a selected area of the gas turbine engine or parts thereof or a specific time during the operation of the gas turbine engine or parts thereof. The state variable may be a measured value or a derived/inferred value that is derived from a measured value.

A parameterisation is intended to mean either a single parameterisation or a plurality of individual parameterisations/sub-parameterisations. Moreover, a parameterization may also be named a parametric equation. Moreover, the model is advantageously a mathematical model.

According to a realisation of the invention the method comprises the step of: parameterising the emission behaviour of the gas turbine engine for the at least one selected first state variable and several different selected second state variables. Thus, the emissions of a wide range of input conditions can be predicted. Advantageously and specifically, the method comprises the step of: performing the parameterisation of the emission behaviour of the gas turbine engine by performing individual parameterisations for the at least one selected first state variable and for each selected second state variable separately. Hence, different state variables can be investigated independently from other parameterisations of further state variables, resulting in a plurality of data sets. The individual parameterisations can be viewed as sub-parameterisations of a complex parameterisation.

Advantageously, at least one individual parameterisation of the emission behaviour of the gas turbine engine is a depiction in a two-dimensional state space. This allows the depiction of dependencies of two state variables in a simple and straightforward manner.

In an embodiment of the invention it is proposed that the method comprises the step of: describing the emission behaviour of the gas turbine engine by using a further state variable of the gas turbine engine. Thus, conditions of the gas turbine engine or parts thereof can be easily defined. This further state variable of the gas turbine engine may be any variable suitable for a person skilled in the art, like an exhaust temperature, a combustion temperature, an amount of unburned hydrocarbons (UHC's), or an emission parameter or most advantageously an emission level of any suitable emission substance or combination of substances or, specifically an emission level of $NO_x$ or an emission level of CO.

Furthermore, the at least one selected first state variable represents an input of the model. In other words, the at least one selected first state variable is an input variable of the model. Moreover, a further state variable, which reflects an emission behaviour of the gas turbine engine, represents an output of the model. In other words, the further state variable is an output variable of the model. Consequently, defined dependencies can be found. Thus, the model maps the at least first state variable of the gas turbine engine as an input variable over a further state variable of the gas turbine engine as an output variable. The output variable may for example be the emission value of $NO_x$ or a signature of the emission under selected conditions.

As stated above, the at least one selected first state variable is used as an input of the model. In an advantage realisation of the inventive method it comprises the step of: executing the model by varying the at least one selected first state variable, wherein further inputs of the model are held constant. This allows a solely examination of one selected or specific variable under defined conditions. As a result of the execution of the model a specific state behaviour of the gas turbine engine in dependency of a specific combination of the at least first state variable and the further state variables can be gained. Subsequently, the method comprises the step of: determining the parameterisation by using the modelled state behaviour of the variation of the at least one selected first state variable.

Moreover, the method comprises the step of: determining the parameterisation by using a discretisation resulting from the variation of the at least one selected first state variable and the modelled state behaviour, especially, a modelled value of a variable of the modelled state behaviour. Hence, the results of the model can be demonstrated simply. This is easily done when the method comprises the step of: determining the parameterisation with an approximation of the discretisation with a continuous function. Thus, the emission behaviour in is converted in a simple mathematical function (typically polynomial expressions). The implemented state of the art PEMS models are typically complex models and require specialist software and significant processing time to run. But by converting the outputs of the model into relatively simple mathematical expressions as proposed by the inventive method, a much faster acting model can be designed using more simple software.

The results of the mathematical function or the signature of the emission can be shown in a graphical representation, providing a simple to read presentation of the results for an operator. Moreover, the mathematical function can be validated by using test and rig data (small constant offsets are permissible) in order to match predicted and calculated values more accurately.

Advantageously, the model is a kinetic model and specifically, the model is a physical kinetic model or most advantageously a chemical a kinetic model. A chemical kinetic model of a specific gas turbine engine or its combustion system will be able to predict emissions for a wide range of input conditions.

Advantageously, the at least one selected first state variable is a variable selected out of the group consisting of: a directly measured parameter, an inferred parameter or a thermodynamically derived parameter. Thus, a wide variety of different variables or concrete values of variables can be considered and used to determine the state behaviour of the gas turbine engine or parts thereof. Additionally, also the further state variable can be selected out of this group.

A thermodynamically derived parameter is one which is based on measured values and constants derived from a factory test of a gas turbine engine. These constants describe component operating conditions (such as compressor turbine stage 1 swallowing capacity and compressor turbine loading) and are based on thermodynamic principles of gas turbine engine operation. When on site, the measured and derived constants are fed into a control algorithm and state variables or parameters which cannot be directly measured are obtained. It is known, for example, to use a calculated turbine inlet temperature to control part load operation of the gas turbine engine.

The at least one selected first state variable may be any parameter feasible for a person skilled in the art. But in case of a—directly—measured parameter it is advantageously a variable selected out of the group consisting of: an ambient inlet pressure, an engine inlet pressure, an ambient inlet temperature, an engine inlet temperature, a compressor inlet temperature, a compressor inlet pressure, a compressor exit pressure or delivery pressure, respectively, a compressor exit temperature or delivery temperature, respectively, a turbine interduct pressure, a turbine interduct temperature, an exhaust temperature, a gas turbine engine operating temperature, a fuel flow, a fuel composition, a fuel temperature or a main to pilot fuel split ration. By using directly measured parameters the actual condition of the gas turbine engine or parts thereof can be accurately detected and considered.

Alternatively, in case that the at least one selected first variable is a thermodynamically derived parameter it is selected out of the group consisting of: a combustor exit pressure or a combustor discharge pressure, respectively, a combustor exit temperature or a combustor discharge temperature, respectively, a firing temperature, a compressor delivery air percentage bleed or a calculated mass flow. By using the inlet mass flow and/or the compressor delivery air percentage bleed from one of its bleed chambers as a thermodynamically derived parameter more accurate modelling of the combustion system of the gas turbine engine can be performed. It may act as a diagnostic tool for the directly measured instruments and allow additional combustor operating parameters to be calculated (e.g. flame temperature, fuel air ratio). Moreover, by using derived parameters sensors for a direct measurement can be omitted, saving space, costs and mounting efforts.

Additionally, fundamental design characteristic of the combustion system may be also taken into account. This may for example be a geometry of components, like a combustor component, or calculated or derived combustor characteristics.

In case of, for example, more than one compressor or more than one turbine all above stated value may be correlated against e.g. the pressure or temperature between two adjacent compressors/turbines.

In an advantageous embodiment the model maps a thermodynamic behaviour of key components of the gas turbine engine allowing a close monitoring. Specifically, the model maps a combustion system of the gas turbine engine thus focussing of a system of the gas turbine engine highly relevant in view of the emissions of the gas turbine engine. A key component may be any component feasible for a person skilled in the art, but advantageously the key component is a component selected out of the group consisting of: a combustion primary zone, a perfectly-stirred reactor, a main flame, a pilot flame, a plug-flow reactor or a mass flow merger, a mass flow splitter, a flow resistance.

In other word, the—chemical kinetic—model describing a specific gas turbine combustion system by creating a network model of the combustion system where key parts of the combustion process are represented by separate model components. Examples include: the combustion primary zone being represented by a series of perfectly-stirred reactor model elements, where main and pilot flames are modelled separately (allowing the effect of main/pilot split to be investigated); downstream components are represented by plug-flow reactor model elements; dilution and mixing represented by appropriate mass flow merger model elements and boundary conditions represented by boundary model elements.

Moreover, the method comprises the step of: using the parameterisation of the emission behaviour of the gas turbine engine to predict an emission behaviour for predetermined values of the at least one selected first state variable. Hence, by using the predicted emission 'signatures' the operation of the gas turbine engine can be a much simpler and faster running in comparison with state of the art systems using complex PEMS models.

The predictions resulting from the model and the subsequent parameterisation are used for running and operating the gas turbine engine. Thus, various mathematical functions obtained from executing the model and the parameterisation are incorporated into a software package for the use in a processor unit of the gas turbine engine. Thus, predicted emission levels are fed in the engine control system. Then, when the gas turbine engine is running on site, the effects of the variations of each parameter using the mathematical functions are combined to calculate predicted emissions.

According to the predictions concrete values of state variables of the gas turbine engine are adjusted to values leading to a result or emission behaviour advised by the prediction of the model. This is of course done by influencing means or parts of the gas turbine engine affecting the concrete values, like temperature, pressure, fuel ratio etc. This may be any part or arrangement feasible for a person skilled in the art, like a valve of a fuel or air supply, a position of a blade or vane, a cooling arrangement for inlet cooling medium etc. Most advantageously a main and pilot fuel split ratio is affected.

Beneficially, the method comprises the step of: using a predicted emission behaviour or signature resulting from the model and the parameterisation to control an emission level during operation of the gas turbine engine. This may be done, as stated above, through manipulation of the main/pilot fuel split. This will allow the PEMS model to optimize emission levels by alteration of the main and pilot fuel split ratio (for example, to ensure emission levels stay within regulated values).

The inventive method is for the use of—chemical kinetic—models of a specific gas turbine engines or their combustion system to obtain emission 'signatures' for directly measured, inferred, and thermodynamically derived parameters, which will then be validated using test and rig performance data at a wide range of operating conditions. This means that the PEMS model is relatively independent of site specific configuration and requires a minimum of adjustment and 'training' on site.

The inventive PEMS model can run either as a stand-alone software package or it can be incorporated into the engine control system.

The present invention further relates to a gas turbine engine comprising at least one processing unit and being operatable with at least one prediction obtained by using to the inventive method.

It is proposed that the model is implemented in the at least one processing unit to predict and/or control an emission behaviour and specifically, an emission level of the gas turbine engine.

Due to this the PEMS model will be able to predict emissions for a wide range of input conditions. Further, it is allowed that predicted emissions levels are utilized in the optimization of actual emission levels. This will for example obtain a balance between combustor pressure dynamics and low emissions, e.g. $NO_X$. Furthermore, the confidence of the model being accurate over a wider range of input and operating conditions is higher than with conventional system, especially if the model is based on chemical kinetic fundamentals. Moreover, the PEMS model is relatively independent of site specific configuration and requires a minimum of adjustment and 'training' on site. Advantageously, it will also accommodate changes to engine operation over extended periods due, for example, to component degradation or the effects of changes to the installation (e.g. fuels, filters, burners). The model is used to make prediction of the emission behaviour under selected conditions. This results in 'signatures' representing these conditions, which were then used in the PEMS model. The use of 'signatures' rather than the model itself means that a complex (and hence time consuming) model can be used to model the combustion, but the final site-based version can be a much simpler and faster running piece of software.

In a further realisation of the invention it is proposed that the gas turbine engine comprises at least one fuel supply arrangement, wherein a main and pilot fuel split ratio of the at least one fuel supply arrangement is adjustable in such a way to influence the emission level according to the prediction of the model.

The above-described characteristics, features and advantages of this invention and the manner in which they are achieved are clear and clearly understood in connection with the following description of exemplary embodiments which are explained in connection with the drawings.

BRIEF DESCRIPTION OF THE DRAWINGS

The present invention will be described with reference to drawings in which:

FIG. 6 shows a diagram depicting the dependency of a $NO_x$ emission from a pilot/main split ratio obtained with the chemical kinetic model from FIG. 2 and FIG. 7: shows a flow diagram showing two possible operational modes of a PEMS model monitoring and controlling emissions from the gas turbine engine from FIG. 1.

DETAILED DESCRIPTION OF THE ILLUSTRATED EMBODIMENTS

The terms upstream and downstream refer to the flow direction of the airflow and/or working gas flow through the gas turbine engine 10 unless otherwise stated. If used and not otherwise stated, the terms axial, radial and circumferential are made with reference to a rotational axis 30 of the gas turbine engine 10.

Figure 1:
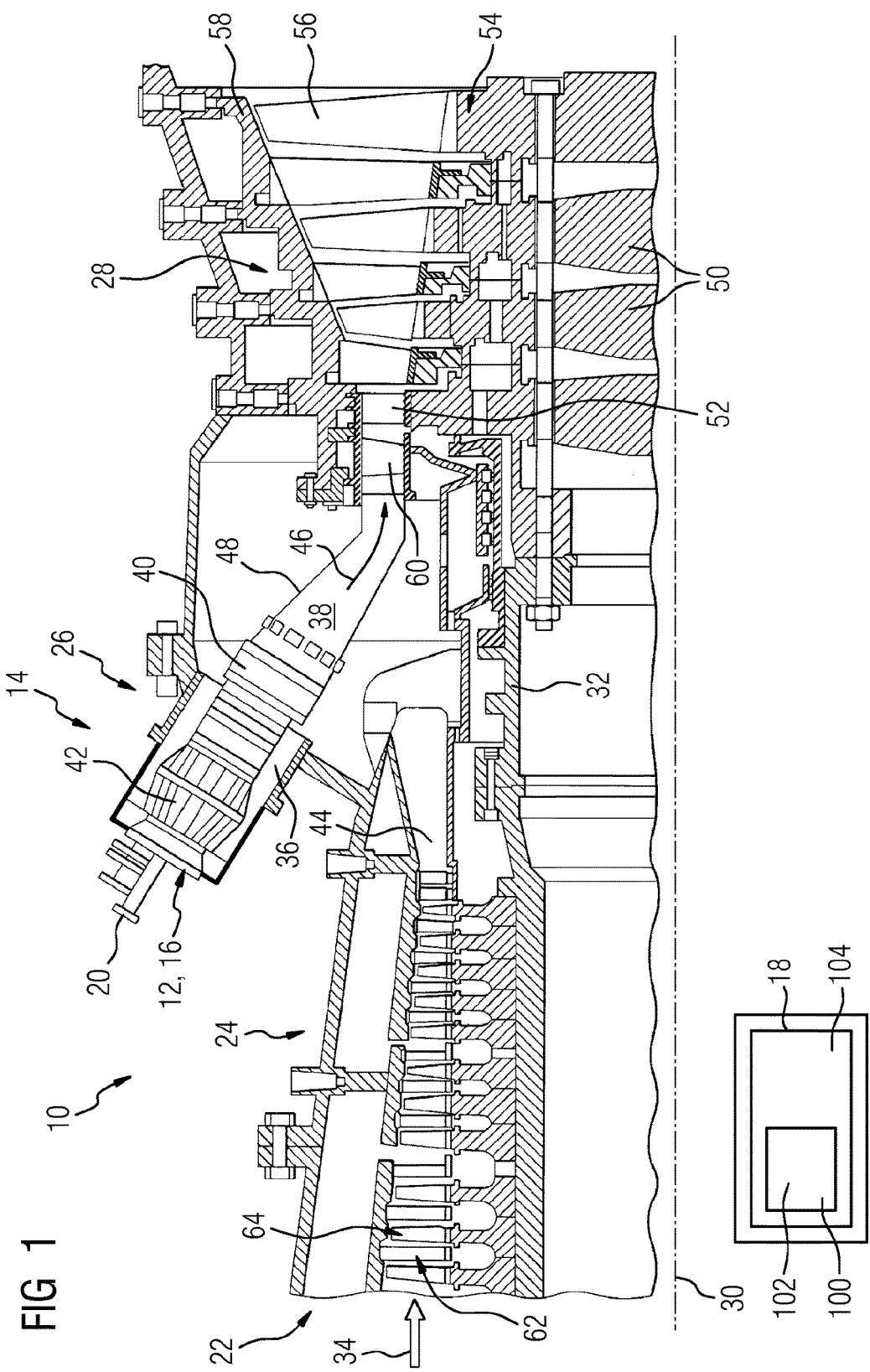
FIG. 1: shows a schematically and sectional view of a gas turbine engine being operatable with the inventive method.

FIG. 1 shows an example of a gas turbine engine 10 in a sectional view. The gas turbine engine 10 comprises, in flow series, an inlet 22, a compressor section 24, a combustion section 26 and a turbine section 28, which are generally arranged in flow series and generally in the direction of a longitudinal or rotational axis 30. The gas turbine engine 10 further comprises a shaft 32 which is rotatable about the rotational axis 30 and which extends longitudinally through the gas turbine engine 10. The shaft 32 drivingly connects the turbine section 28 to the compressor section 24.

In operation of the gas turbine engine 10, air 34, which is taken in through the air inlet 22 is compressed by the compressor section 24 and delivered to the combustion section or burner section 26. The burner section 26 comprises a combustion system 14 with a burner plenum 36, one or more combustion chambers 38 defined by a double wall can 40 and at least one burner 42 fixed to each combustion chamber 38. The combustion chamber(s) 38 and the burner(s) 42 are located inside the burner plenum 36. The compressed air passing through the compressor section 24 enters a diffuser 44 and is discharged from the diffuser 44 into the burner plenum 36 from where a portion of the air enters the burner 42 and is mixed with a gaseous or liquid fuel. The air/fuel mixture is then burned and the combustion gas 46 or working gas from the combustion is channeled via a transition duct 48 to the turbine section 28.

The turbine section 28 comprises a number of blade carrying production discs 50 or turbine wheels attached to the shaft 32. In the present example, the turbine section 28 comprises four discs 50 each carry an annular array of turbine blades 52. However, the number of blade carrying production discs 50 could be different, i.e. only one production disc 50 or more than one production discs 50. In addition, stator stages or turbine cascades 54 are disposed between the turbine blades 52. Each stator stage carries an annular array of guiding vanes 56, which are fixed to a stator 58 of the gas turbine engine 10. Between the exit of the combustion chamber 38 and the leading turbine blades 52 inlet guiding vanes or nozzle guide vanes 60 are provided.

The combustion gas 46 from the combustion chamber 36 enters the turbine section 28 and drives the turbine blades 52 which in turn rotate the shaft 32. The guiding vanes 56, 60 serve to optimise the angle of the combustion or working gas 46 on to the turbine blades 52. The compressor section 24 comprises an axial series of guide vane stages 62 and rotor blade stages 64 with turbine blades 52 or vanes 56, respectively.

Furthermore, the gas turbine engine 10 comprises a processor unit 18 that is depicted outside of the gas turbine engine 10 for better presentability. To determine an emission behaviour of a gas turbine engine 10 or for monitoring and control emissions of the gas turbine engine 10, like $NO_x$ and/or CO, the processor unit 18 comprises an implemented model of a Predictive Emissions Monitoring System (PEMS) 104. The PEMS model 104 is based on the principles of a combination of a chemical kinetic model 102 and a parameterisation 100 or in other words, a parametric equation or model 102, which will be described in reference to FIG. 2 to 7.

The PEMS model 104 is achieved through the modelling of selected systems of the gas turbine engine 10, like a combustion system 14 of the gas turbine engine 10. The modelling uses a chemical kinetics model 102 that will utilize the same input parameters or state variables P0, P1, P2, P3, P4, T0, T1, T2, T3, T4, T5, P2B, MCI, TFIRE, QF, QH, QT, SPLIT (see below) as the final PEMS model 104. However, the model 102 results are converted into mathematical functions which can be used to predict emissions without the need for online running of the chemical kinetics model 102.

Figure 2:
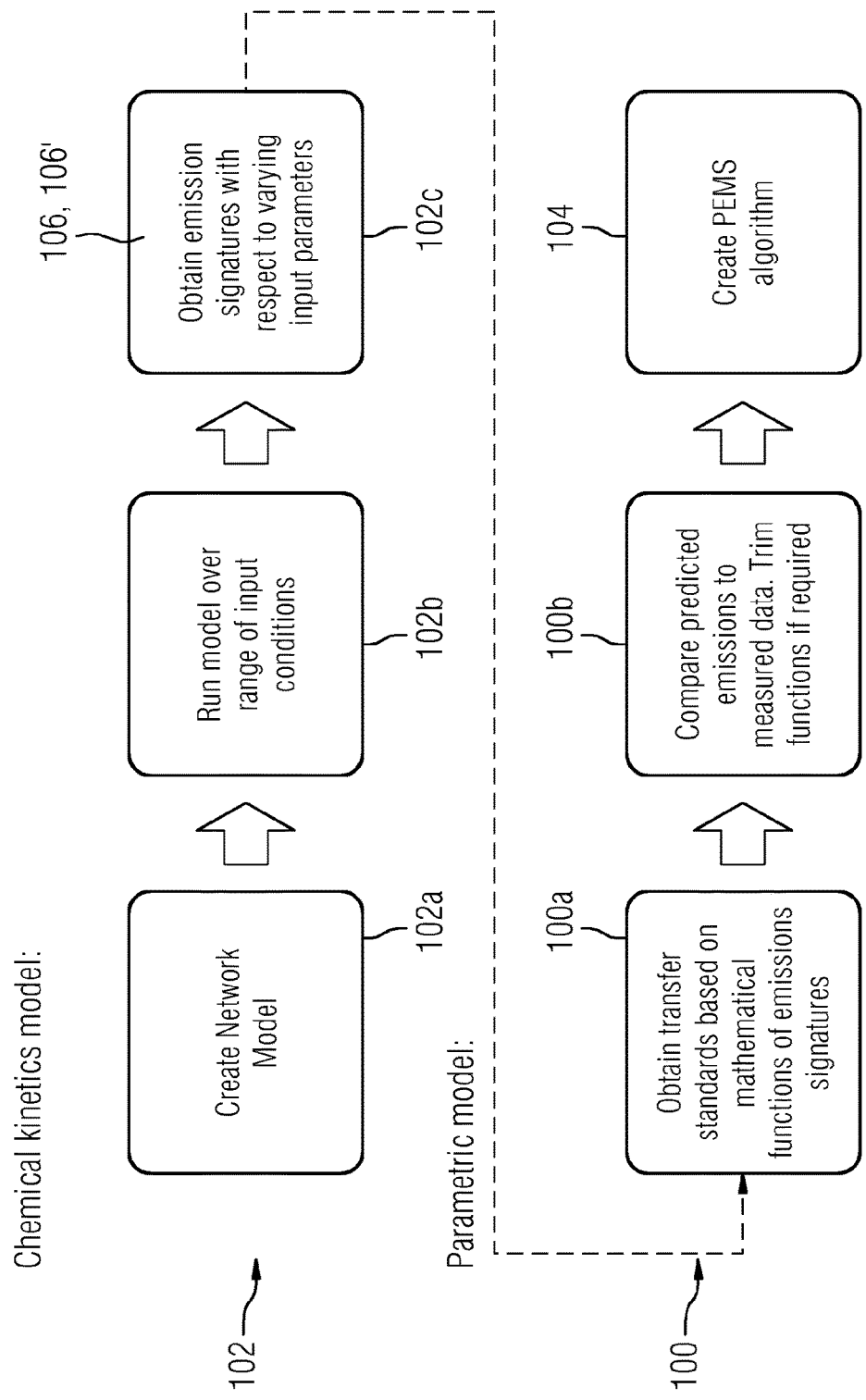
FIG. 2: shows a flow diagram of a chemical kinetic model and of a parameterisation implemented in a processor unit of the gas turbine engine from FIG. 1, FIG. 3: shows exemplarily and simplified possible analysis elements of the chemical kinetic model of FIG. 2, FIG. 4: shows schematically the gas turbine engine from FIG. 1 with engine positions from where state variables of the chemical kinetic model of FIG. 2 are obtained.

A process to develop such a PEMS model 104 is depicted in the flow diagram of FIG. 2.

For developing the chemical kinetic model 102 describing a specific combustion system 14 of the gas turbine engine 10 a suitable network model of the combustion system 14 is created (step 102a). Therefore, key parts or components 12 of the combustion process are identified. These key components 12 are represented by separate model components or analysis elements. This is exemplarily and simplified shown for two key components 12 in FIG. 3 (also see FIG. 1). The key component 12 may be, for example, a combustion primary zone 16 being represented by a series of perfectly-stirred reactor (PSR) 66 model elements, where main and pilot flames 68 are modelled separately (allowing the effect of main/pilot split to be investigated). A further key component 12 may be located in a downstream combustion zone 70 and be represented by plug-flow reactor (PFR) 72 model elements.

Additional key components 12 would be represented, for example, by appropriate mass flow merger model elements representing dilution and mixing of the various modelled gas streams, for example air or combustion products, or fuel, or by a mass flow splitter element or a flow resistance element. Boundary conditions (For example, how big is the volume of selected components or how much time is available for different processes) would be represented by boundary model elements (not shown).

Figure 3:
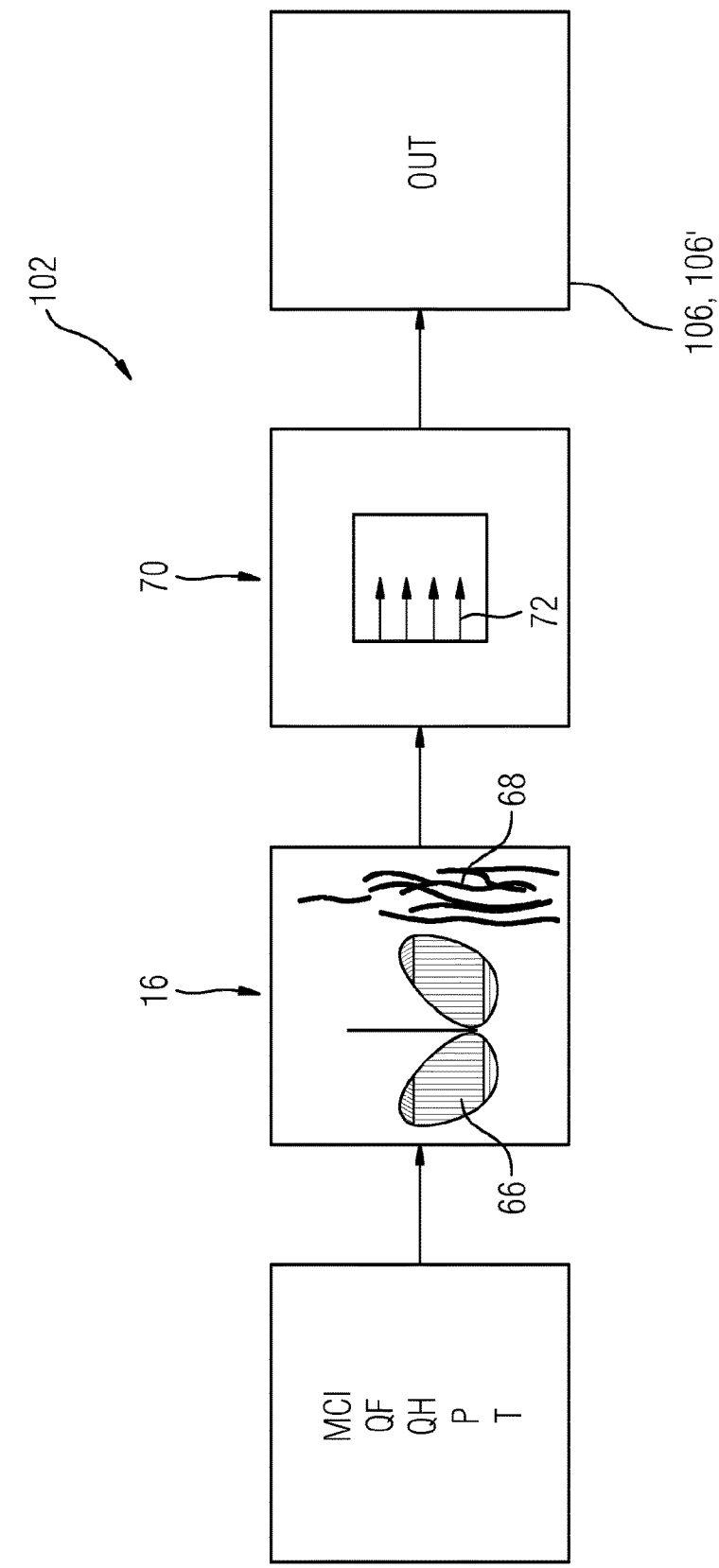

As could be seen in FIG. 3 at least one selected first state variable MCI is used as an input of the model 102. While this is defined as a 'mass flow' inlet it also contains selected pressures P, selected temperatures T, the fuel composition QH and the flow QF due to that the 'mass flow' inlet is a thermodynamically derived parameter. Other possible selected first state variables are P0, P1, P2, P3, P4, T0, T1, T2, T3, T4, T5, P2B, TFIRE, QF, QH, QT, SPLIT.

These variables P0, P1, P2, P3, P4, T0, T1, T2, T3, T4, T5, P2B, MCI, TFIRE, QF, QH, QT, SPLIT is either a directly measured parameter, an inferred parameter or a thermodynamically derived parameter.

Figure 4:
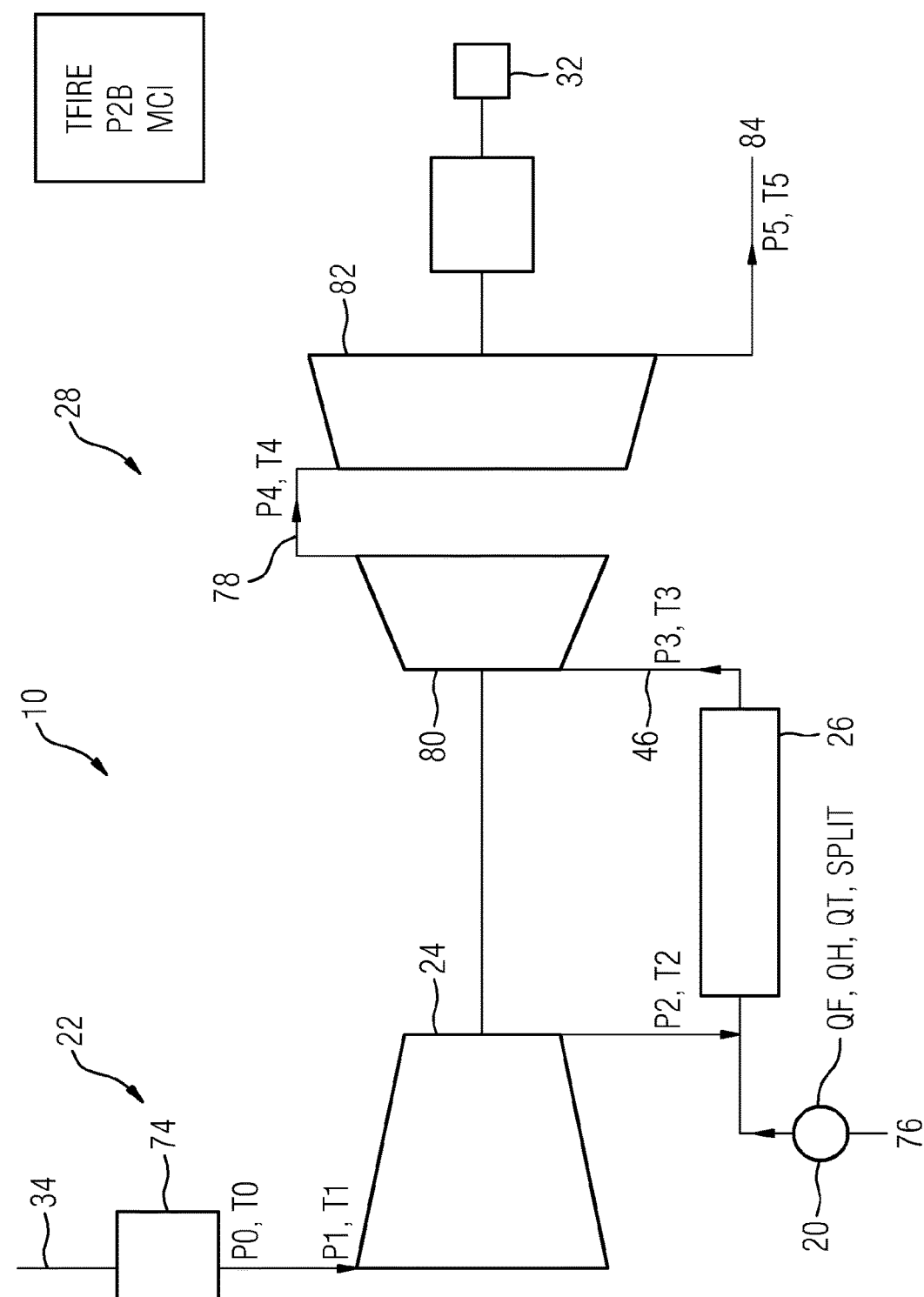

In FIG. 4 it is shown at which engine positions which conditions are present and where state variables P0, P1, P2, P3, P4, T0, T1, T2, T3, T4, T5, P2B, MCI, TFIRE, QF, QH, QT, SPLIT of the chemical kinetic model 102 may be obtained. Before entering the gas turbine engine 10 ambient air 34 has an ambient pressure and an ambient temperature (not specifically depicted with reference numerals). At the inlet 22 the air 34 traveling through a filter housing 74 has engine inlet pressure P0 and engine inlet temperature T0. Air entering a compressor of the compressor section 24 has compressor inlet pressure P1 and compressor inlet temperature T1. P2 is the compressor exit pressure, also named combustion chamber inlet pressure P2 or compressor delivery pressure P2, and T2 is the compressor exit temperature, also named combustion chamber inlet temperature T2 or compressor delivery temperature T2. Variable referring to the fuel 76 and the fuel supply arrangement 20 are a fuel flow QF, fuel composition QH, a fuel temperature QT and a main and pilot fuel split ratio SPLIT. Combustion gas 46 exiting the combustion section 26 has combustor exit pressure P3 and combustor exit temperature T3. Flow medium traveling an interduct 78 located between a compressor turbine 80 and a power turbine 82 of the turbine section 28 has turbine interduct pressure P4 and turbine interduct temperature T4. An exhaust gas 84 exiting the gas turbine engine 10 has an exhaust pressure P5 and an exhaust temperature T5.

Directly measured parameter can be the engine inlet pressure P0, the engine inlet temperature T0, the compressor inlet temperature T1, the compressor inlet pressure P1, the compressor exit pressure P2, the compressor exit temperature T2, the turbine interduct pressure P4, the turbine interduct temperature T4, the exhaust temperature T5, the gas turbine engine operating temperature, the fuel flow QF, the fuel composition QH, the fuel temperature QT or the main and pilot fuel split ratio SPLIT. All these variables may be measured by one or more not shown sensors.

The used abbreviation for the gas turbine operating temperature depends on the gas turbine engine type and may be TOP, TMAX or TLIMIT and it is calculated based on some of the above measured values (not shown).

Variables that might be inferred based on relationship parameters may be the compressor inlet pressure P1, the fuel flow QF, the fuel composition QH and the exhaust temperature T5.

Thermodynamically derived values use a combination of direct measurements and component characteristics derived from internal factory testing of the engine and might be the combustor exit pressure P3, the combustor exit temperature T3, an engine firing temperature TFIRE, a compressor bleed P2B or a calculated inlet mass flow MCI.

Moreover, fundamental design characteristic of the combustion system (used in chemical kinetics model) might be considered as well and they may be a combustor component geometry or calculated or derived combustor characteristics.

P2, T2, SPLIT, QH, QF, TFIRE, P2B and MCI are primary input parameter to the PEMS model or the used parametric model 100, respectively.

Subsequently, in step 102b the model 102 is run over a range of input conditions or in other words, the model 102 is executing by varying the at least one selected first state variable MCI, wherein further inputs or other input variables or selected second state variables P0, P1, P2, P3, P4, T0, T1, T2, T3, T4, T5, P2B, MCI, TFIRE, QF, QH, QT, SPLIT of the model 102 are held constant.

This may be done for several or all variable P0, P1, P2, P3, P4, T0, T1, T2, T3, T4, T5, P2B, MCI, TFIRE, QF, QH, QT, SPLIT individually. By varying individual boundary parameters/variables P0, P1, P2, P3, P4, T0, T1, T2, T3, T4, T5, P2B, MCI, TFIRE, QF, QH, QT, SPLIT while all other input parameters P0, P1, P2, P3, P4, T0, T1, T2, T3, T4, T5, P2B, MCI, TFIRE, QF, QH, QT, SPLIT are held constant (insofar as reasonably practical) the effect of each parameter P0, P1, P2, P3, P4, T0, T1, T2, T3, T4, T5, P2B, MCI, TFIRE, QF, QH, QT, SPLIT on emissions over the parameter modelling range is obtained.

Parameters/variables P0, P1, P2, P3, P4, T0, T1, T2, T3, T4, T5, P2B, MCI, TFIRE, QF, QH, QT, SPLIT to be varied are ones that have an equivalent 'on-site' direct measurement available (P0, P1, P2, P4, T0, T1, T2, T4, T5, QF, QH, QT, SPLIT), can be inferred from a proven relationship to other directly measured parameters (P1, P3, T3, QF, QH, T5), or be a thermodynamically derived value using a combination of direct measurements and component characteristics derived from internal factory testing of the gas turbine engine 10 (P3, T3, TFIRE, P2B, MCI).

In step 102c of the model 102 emission 'signatures' 106, 106' with respect to the varying of the input parameters or the selected first and second state variables P0, P1, P2, P3, P4, T0, T1, T2, T3, T4, T5, P2B, MCI, TFIRE, QF, QH, QT, SPLIT, respectively, are obtained. The results of the variations may be represented graphically and known as the parameter 'signature' 106, 106'. Two exemplary signatures 106, 106' are shown in FIGS. 5 and 6, which show each a diagram depicting the dependency of a $NO_x$ emission from a combustor entry temperature T2 (FIG. 5) and a pilot/main split ration SPLIT (FIG. 6) obtained with the chemical kinetic model 102.

Figure 5:
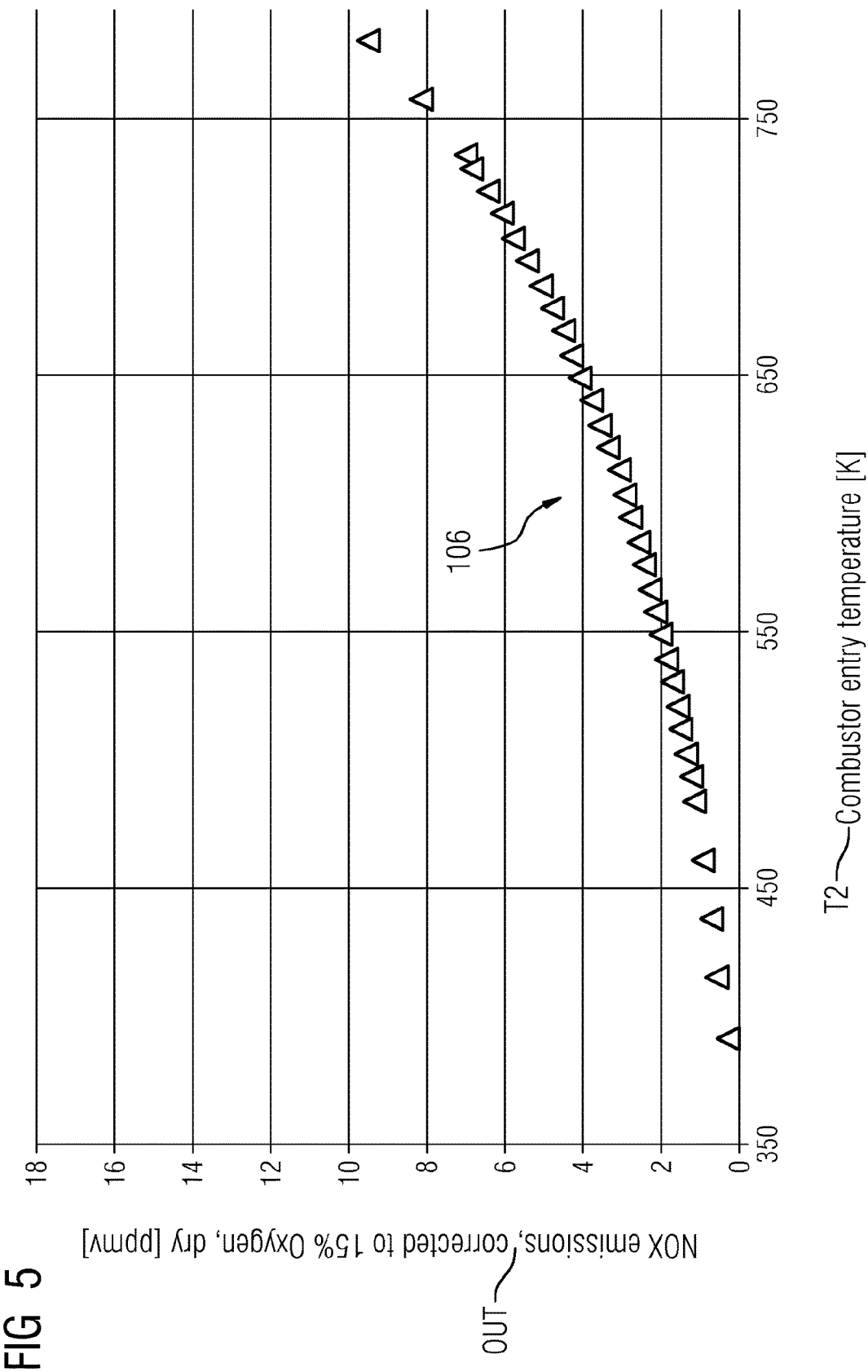
FIG. 5: shows a diagram depicting the dependency of a $NO_x$ emission from a combustor entry temperature obtained with the chemical kinetic model from FIG. 2.

As can be seen in FIGS. 5 and 6 the emission behaviour of the gas turbine engine 10 is described by using a further state variable OUT of the gas turbine engine (10) specifically an emission level of $NO_x$. In other words, the further state variable OUT, which reflects the emission behaviour of the gas turbine engine 10, represents an output of the model 102 (see also FIG. 3).

Subsequently, in step 100a (Obtaining transfer standards based on mathematical functions of emission levels) the parameterisation 100 is done or the parametric model is executed. This is done by using the modelled state behaviour of the variation of the at least one selected first state variable P0, P1, P2, P3, P4, T0, T1, T2, T3, T4, T5, P2B, MCI, TFIRE, QF, QH, QT, SPLIT and specifically, by using a discretisation resulting from the variation of the at least one selected first state variable P0, P1, P2, P3, P4, T0, T1, T2, T3, T4, T5, P2B, MCI, TFIRE, QF, QH, QT, SPLIT and the modelled state behaviour, especially, a modelled value of a variable of the modelled state behaviour and specifically, by determining the parameterisation 100 with an approximation of the discretisation with a continuous function.

In other words, the emission signatures 106, 106' or their graphical representations, respectively, are converted into relatively simple mathematical functions (typically polynomial expressions).

An example of such a mathematical function might be the following function, which represents the NOx emission OUT in dependency of the compressor delivery pressure PCD or the compressor exit pressure P2:

$$NO_x = 12.26 + (4.93E^{-31} * P2^5) + (3.157E^{-18} * P2^5) - (1.88E^{-24} * P2^4) - (8.267E^{-13} * P2^2) - (4.58E^{-38} * P2^5) - (0.0000034 * P2)$$

In a further step 100b the predicted emissions are compared to measured data. If required the functions might be trimmed. Moreover, the mathematical functions may be validated using test and rig data and small constant offsets are permissible in order to match predicted and calculated values more accurate.

The parameterisation 100 of the emission behaviour of the gas turbine engine 10 is performed by individual parameterisations 100 for the at least one selected first state variable P0, P1, P2, P3, P4, T0, T1, T2, T3, T4, T5, P2B, MCI, TFIRE, QF, QH, QT, SPLIT and for each selected second state variable P0, P1, P2, P3, P4, T0, T1, T2, T3, T4, T5, P2B, MCI, TFIRE, QF, QH, QT, SPLIT separately.

Furthermore, one or each individual parameterisation 100 of the emission behaviour of the gas turbine engine 10 is a depiction in a two-dimensional state space.

In general, the inventive method comprises the steps of: parameterising 100 the emission behaviour of the gas turbine engine 10 for at least one selected first state variable P0, P1, P2, P3, P4, T0, T1, T2, T3, T4, T5, P2B, MCI, TFIRE, QF, QH, QT, SPLIT of the gas turbine engine 10 by using the model 102, which reflects a state behaviour of the gas turbine engine 10, and determining the emission behaviour of the gas turbine engine 10 by using the parameterisation 100.

The mathematical functions are used to create a PEMS algorism or model 104 (see FIG. 2). The various mathematical functions representing the dependencies of the state variables P0, P1, P2, P3, P4, T0, T1, T2, T3, T4, T5, P2B, MCI, TFIRE, QF, QH, QT, SPLIT, OUT are incorporated into a software package. This is shown in FIG. 7 that shows a flow diagram showing two possible operational modes of a PEMS model monitoring and controlling emissions from the gas turbine engine 10. Then, when the gas turbine engine 10 is running on site, the effect of the variations of each parameter P0, P1, P2, P3, P4, T0, T1, T2, T3, T4, T5, P2B, MCI, TFIRE, QF, QH, QT, SPLIT using the mathematical functions are combined to calculate predicted emissions (step 108). Thus, the parameterisation 100 of the emission behaviour of the gas turbine engine 10 is used to predict an emission behaviour for predetermined values of the at least one selected first state variable P0, P1, P2, P3, P4, T0, T1, T2, T3, T4, T5, P2B, MCI, TFIRE, QF, QH, QT, SPLIT.

The model 102 or the resulting PEMS model 104 may be implemented in the processing unit 18 of the gas turbine engine 10 (left side of FIG. 7) or might be a standalone software package (right side of FIG. 7).

The predicted emission levels may be stored in a database (step 110) or they may are fed in the engine control system (step 112) and can be used to control emission levels of the gas turbine engine 10. This may be done by adjusting the main and pilot fuel split ratio SPLIT of the fuel supply arrangement 20 in such a way to influence the emission level according to the prediction of the model 102 (step 114).

As a result, the invention will predict and control emission levels (primarily $NO_x$ and CO) using mathematically derived emission signatures based on chemical kinetic models of measured input parameters and thermodynamically derived parameters.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the invention is illustrated and described in detail by the preferred embodiments, the invention is not limited by the examples disclosed, and other variations can be derived therefrom by a person skilled in the art without departing from the scope of the invention.

The invention claimed is:

1. A method for determining an emission behaviour of a gas turbine engine, the method comprising:
    executing a model of a system of the gas turbine engine that predicts emission behaviours by varying at least one selected first state variable used as an input to the model;
    obtaining an output of the model representing a predicted emission behaviour of the gas turbine engine for the variation;
    parameterising the predicted emission behaviour output from the model by converting the output into mathematical functions;
    determining the emission behaviour of the gas turbine engine by using the mathematical functions; and
    controlling an emission level of the gas turbine engine based on the determined emission behaviour.

2. The method according to claim 1, wherein the method further comprises:
    parameterising the predicted emission behaviour of the gas turbine engine for the at least one selected first state variable and for several different selected second state variables,
    wherein the parameterising comprises individual parameterisations for the at least one selected first state variable and for each selected second state variable, separately.

3. The method according to claim 2,
    wherein at least one individual parameterisation of the predicted emission behaviour of the gas turbine engine is a depiction in a two-dimensional state space.

4. The method according to claim 1,
    wherein, for the at least one selected first state variable that represents the input of the model, a further state variable, which reflects a predicted emission behaviour of the gas turbine engine, represents the output of the model.

5. The method according to claim 1, wherein the method further comprises:
    varying the at least one selected first state variable used as the input to the model for a range of input conditions, wherein other state variables comprising further inputs of the model are held constant.

6. The method according to claim 1, wherein the method further comprises:
    determining the parameterisation by using a discretisation resulting from the variation of the at least one selected first state variable and the model.

7. The method according to claim 6,
wherein the model comprises modelled state behavior which is a modelled value of a variable of the modelled state behaviour, and
the method further comprising determining the parameterisation with an approximation of the discretisation with a continuous function.

8. The method according to claim 1,
wherein the model is a kinetic model, physical kinetic model, or a chemical kinetic model.

9. The method according to claim 1,
wherein the at least one selected first state variable is a variable selected out of the group consisting of: a directly measured parameter, an inferred parameter or a thermodynamically derived parameter.

10. The method according to claim 1,
wherein the at least one selected first state variable is a variable selected out of the group of directly measured parameters consisting of: an ambient inlet pressure, an engine inlet pressure, an ambient inlet temperature, an engine inlet temperature, a compressor inlet temperature, a compressor inlet pressure, a compressor exit pressure, a compressor exit temperature, a turbine interduct pressure, a turbine interduct temperature, an exhaust temperature, a gas turbine engine operating temperature, a fuel flow, a fuel composition, a fuel temperature or a main and pilot fuel split ratio.

11. The method according to claim 1,
wherein the at least one selected first state variable is a variable selected out of the group of thermodynamically derived parameters consisting of: combustor exit pressure, combustor exit temperature, an engine firing temperature, a compressor delivery air percentage bleed or a calculated mass flow.

12. The method according to claim 1,
wherein the model maps a thermodynamic behaviour of key components of the gas turbine engine.

13. The method according to claim 12,
wherein the model maps a thermodynamic behaviour of key components of the combustion system of the gas turbine engine.

14. The method according to claim 13,
wherein the key component is a component selected out of the group consisting of: a combustion primary zone, a perfectly-stirred reactor, a main flame, a pilot flame, a plug-flow reactor, a mass flow merger, a mass flow splitter or a flow resistance.

15. The method according to claim 1, wherein the method further comprises:
using the parameterisation of the predicted emission behaviour of the gas turbine engine to determine an emission behaviour of the gas turbine engine during operation without online running of the model of the system.

16. A gas turbine engine comprising:
at least one processing unit configured to perform the method according to claim 1.

17. The gas turbine engine according to claim 16, further comprising:
at least one fuel supply arrangement,
wherein a main and pilot fuel split ratio of the at least one fuel supply arrangement is adjustable in such a way to influence the emission level according to the determined emission behaviour.

18. The method according to claim 1,
wherein the predicted emission behaviour comprises an emission level, an emission level of NOx, or an emission level of CO.

19. A method for determining an emission behaviour of a gas turbine engine, comprising:
obtaining an output of a model of a system of the gas turbine engine, wherein the output represents a predicted emission behaviour of the gas turbine engine for state variables used as inputs to the model;
parameterising the output from the model by converting the output into mathematical functions, wherein the mathematical functions represent dependencies of the state variables;
determining the emission behaviour of the gas turbine engine during operation by using the mathematical functions; and
controlling an emission level of the gas turbine engine based on the determined emission behaviour.

20. The method of claim 19, further comprising:
creating the model of the system of the gas turbine engine comprising a kinetic model, physical kinetic model, or a chemical kinetic model;
executing the model over a range of input conditions by varying input parameters comprising directly measured, inferred, and/or thermodynamically derived parameters; and
obtaining emission signatures with respect to the varying input parameters as the output of the model.

* * * * *